United States Patent [19]

Jacks

[11] 4,417,253

[45] Nov. 22, 1983

[54] ARRANGEMENT FOR LASER PUMPING IN A COMBINED LASER RECORDING AND COLOR PROJECTION SYSTEM

[75] Inventor: Herbert G. Jacks, Tujunga, Calif.

[73] Assignee: The Singer Company, Stamford, Conn.

[21] Appl. No.: 331,439

[22] Filed: Dec. 16, 1981

[51] Int. Cl.³ .......................... G01D 9/32; H01S 3/091
[52] U.S. Cl. ....................................... 346/17; 350/173; 372/70
[58] Field of Search .................... 372/70, 72; 350/169, 350/170, 172, 173, 171; 356/72, 153; 346/17, 76 L; 353/82

[56] References Cited

U.S. PATENT DOCUMENTS

| | | | |
|---|---|---|---|
| 3,233,108 | 2/1966 | Rosenblum | 372/26 |
| 3,961,334 | 6/1976 | Whitby et al. | 350/173 X |
| 4,039,970 | 8/1977 | Shiroki et al. | 372/70 |
| 4,140,979 | 2/1979 | Ramer | 372/79 |

*Primary Examiner*—James W. Davie
*Attorney, Agent, or Firm*—David L. Davis; Robert E. Smith; Edward L. Bell

[57] ABSTRACT

In a display system which uses a laser beam for writing data and a projection lamp for projecting the written data onto a viewing surface, there is provided an arrangement which utilizes the projection lamp for providing excitation energy for the laser.

6 Claims, 2 Drawing Figures ered. One of 4,417,253

ARRANGEMENT FOR LASER PUMPING IN A COMBINED LASER RECORDING AND COLOR PROJECTION SYSTEM

BACKGROUND OF THE INVENTION

This invention relates to laser recording and projection system and, more particularly, to an arrangement for providing excitation energy for the laser within such a system.

Lasers require radiant energy input in order to excite the ions of the active lasing material into a higher energy level. Various proposals have been made in the past for effecting such excitation. Some of these proposals have even suggested utilizing solar energy. One of the most widely utilized techniques for exciting a laser is to have a linear light source parallel to the rod of lasing material, both enclosed in an elliptical housing and each disposed at a respective focal point of the ellipse. A typical linear light source utilizes a tungsten halogen lamp. A disadvantage of such an arrangement is that it requires cooling of the laser and the light source. However, the physical configuration of the enclosure is inconsistent with good cooling. Accordingly, it is an object of the present invention to provide an improved arrangement for providing excitation energy for a laser with a minimum requirement for cooling the laser.

One use of a laser is in a combined laser recording and color projection system wherein data is recorded by laser action on a recording medium and a projection system projects the data, by backlighting the recording medium, onto a display screen. In such a system, only a portion of the energy spectrum of the projection system is utilized. Accordingly, it would be desirable to be able to utilize the previously wasted projection lamp energy for exciting the laser.

SUMMARY OF THE INVENTION

The foregoing and additional objects are attained in accordance with the principles of this invention is a recording and projection system which includes a laser utilized for recording an image and a source of projection light utilized for projecting the recorded image, by providing means utilizing the projection light source for providing excitation energy for the laser.

In accordance with an aspect of this invention, the excitation energy providing means includes means for directing light having wavelengths above the normal visible range from the projection light source to the laser.

BRIEF DESCRIPTION OF THE DRAWINGS

The foregoing will be more readily apparent upon reading the following description in conjunction with the drawings wherein.

DETAILED DESCRIPTION

Figure 1:
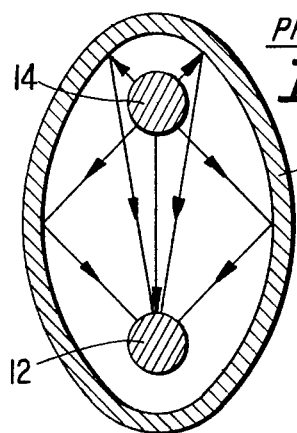
FIG. 1 is a sectional view pictorially illustrating a conventional prior art laser enclosure including an excitation source.

Referring now to the drawings, FIG. 1 is a sectional view pictorially illustrating a prior art laser enclosure 10 of generally elliptical cross sectional configuration. Mounted within the enclosure 10, by means not shown, is a laser 12 of generally cylindrical rod-like form and a linear light source 14, which may illustratively be a tungsten halogen lamp. The laser 12 is positioned at a first focal point of the elliptical shape of the enclosure 10 and the light source 14 is positioned at the second focal point of the elliptical shape of the enclosure 10. Accordingly, energy from the light source 14 will either directly impinge upon the laser 12 or else will be reflected off the inner reflective surface of the enclosure 10 and impinge upon the laser 12. This energy is utilized to excite, or pump, the active material of the laser 12 into one of its higher energy levels, as is well known in the art. While the arrangement shown in FIG. 1 is effective for pumping a laser, a problem exists in that the physical configuration of the enclosure is inconsistent with good cooling characteristics. Accordingly, elaborate schemes, including the use of water as a coolant, have had to be devised for cooling purposes.

Figure 2:
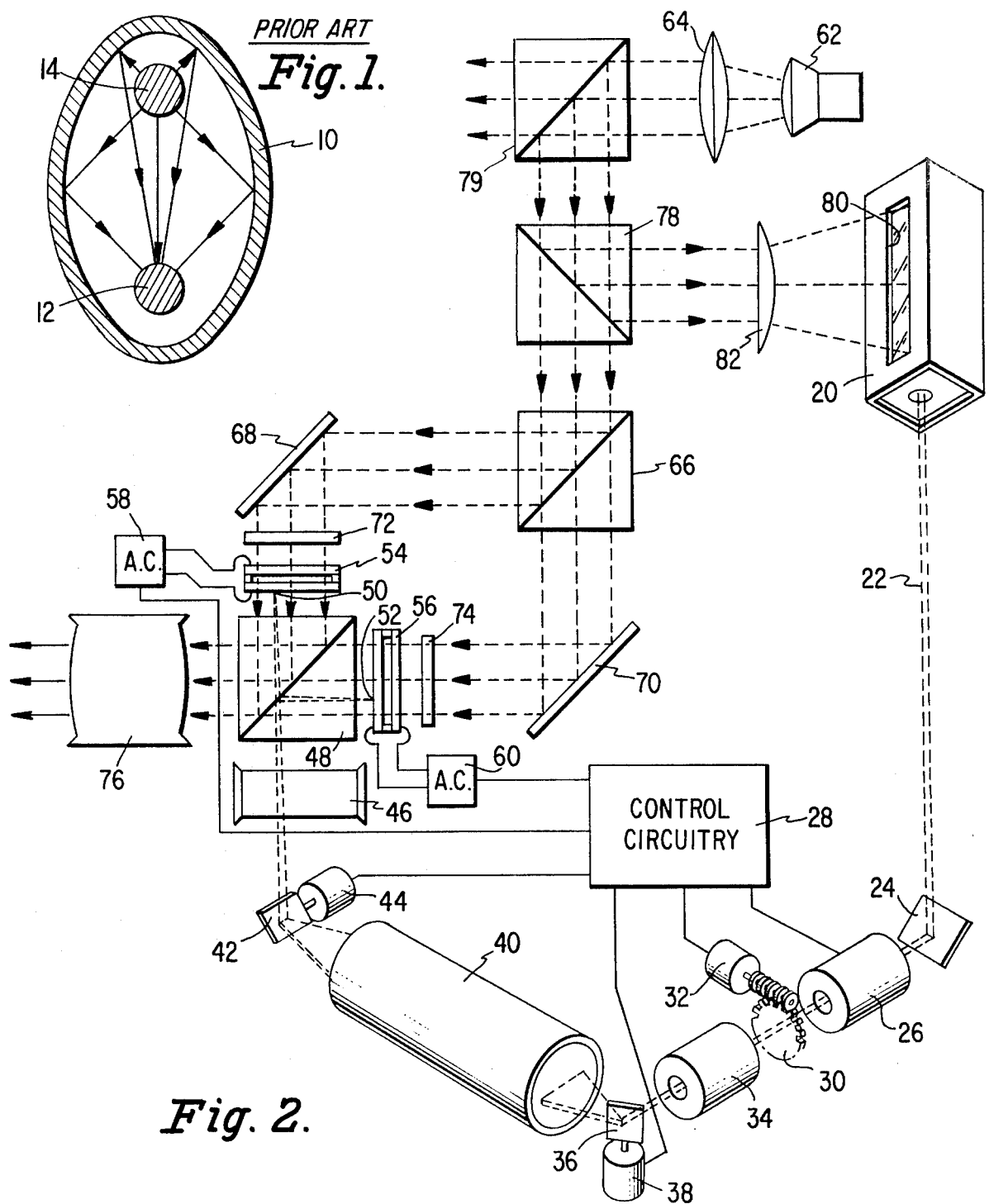
FIG. 2 is a simplified drawing schematically illustrating a combined laser recording and color projection system having incorporated therein apparatus constructed in accordance with the principles of this invention.

FIG. 2 illustrates a laser recorder and projection system in which the aforedescribed disadvantages are overcome in accordance with the principles of this invention. The system shown in FIG. 2 includes a laser 20 providing an output beam 22 which is reflected by a mirror 24 and enters an acousto-optic modulator 26. As is well known in the art, the acousto-optic modulator 26, upon command of control circuitry 28, selectively prevents or allows the beam 22 from exiting therefrom.

After the beam 22 leaves the acousto-optic modulator 26, it passes through a polarization rotator 30. The polarization rotator 30 is illustratively a one-half wavelength retardation plate rotatable by means of a stepper motor 32 under the control of the control circuitry 28, to rotate the polarization of the beam 22 within a range of from 0° to 90° with respect to the polarization characteristics of the subsequent optical elements in the system of FIG. 2. Thus, the control circuitry 28 may selectively energize the stepper motor 32 to rotate the half wavelength retardation plate 30 so as to produce a laser beam having a desired polarization between a first plane of polarization and a second plane of polarization.

The appropriately polarized laser beam then passes through a beam expander 34 and impinges upon the mirror 36 of the X-deflection galvanometer 38 which is under the control of the control circuitry 28 to deflect the laser beam along the horizontal direction as it enters the relay lens 40. The relay lens 40 operates to focus the X-deflected laser beam from the mirror 36 upon the mirror 42 of the Y-deflection galvanometer 44. The laser beam is then focused by a focus lens 46 and passes through the dichroic polarizer cube 48.

The dichroic polarizer cube 48 has the characteristic that it either reflects or transmits the laser beam passing therethrough, depending upon the plane of polarization of the laser beam. Accordingly, the beam from the laser 20, having been suitably deflected by the X-deflection galvanometer 38 and the Y-deflection galvanometer 44, is focused by the focusing lens 46 to the focal points 50 or 52, depending upon the polarization impressed by the laser beam by the half wavelength retardation plate 30. Positioned at the focal points 50 and 52 are locally erasable recording mediums, preferably smectic liquid crystal display cells 54 and 56. As is known, the laser beam can be utilized to "write" information selectively into the display cells 54 and 56. Once information is "written into" the liquid crystal display cells 54 and 56, it can be stored or, if desired, the cell can be erased, in whole or in part, by applying a suitable AC voltage to the cell from the AC sources 58 and 60. Light may then be projected through the cells and through a projection system for displaying the information "written into" the cells.

The focused laser beam, having an energy distribution determined by the angular position of the half wavelength retardation plate 30, is scanned across the display cells 54 and 56 and selectively blanked and unblanked by the acousto-optic modulator 26 under the control of control circuitry 28, to write information onto the display cells 54 and 56. At the same time that the focused laser beam is recording data on the display cells 54 and 56, these cells are being backlighted so that the images thereon are projected to a suitable display screen. The projection system includes a Xenon lamp 62. The Xenon lamp 62 is at the focal point of a condensing lens 64 which collimates and directs the output light of the lamp 62 to a dichroic cube 66. The dichroic cube 66 contains a dichroic that transmits light energy within the range of visible wavelengths at the red end of the spectrum and reflects light energy at the green end of the spectrum.

Thus, the light from the lamp 62 is divided into a short wavelength visible light beam (the green beam) which is reflected by the cube 66 and a long wavelength visible light beam (the red beam) which is transmitted by the cube 66. The reflected short wavelength visible light beam is directed by a mirror 68 to backlight the display cell 54 and the long wavelength visible light beam that is transmitted by the cube 66 is directed by a mirror 70 to backlight the display cell 56. A green filter 72 is interposed in the short wavelength visible light beam and a red filter 74 is interposed in the long wavelength visible light beam. Accordingly, the image which was written into the display cell 54 is backlit with light of a first color and the image which was written into the display cell 56 is backlit with light of a second color.

The cube 48 also has dichroic properties identical to those of the cube 66 so that the light band that was reflected by the cube 66 will also be reflected by the cube 48 and the light band transmitted by the cube 66 will also be transmitted by the cube 48. Therefore, the reflected light band from the cube 66 will be projected through the display cell 54 and this band will again be reflected by the dichroic in the cube 48 to pass through the projection lens 76 to a suitable display screen. In like manner, the band transmitted by the cube 66 will pass through the display cell 56 and will also be transmitted by the cube 48 to the projection lens 76 and onto the suitable display screen.

Preferably, the laser 20 is a yttrium aluminum garnet (YAG) laser and it has been found that infrared light in the 700 to 900 nanometer wavelength region is suitable as a source of excitation energy. The Xenon lamp 62 produces light in this range of wavelengths, which is above the normal visible range, but this light is normally not utilized. Thus, in accordance with the principles of this invention, there is provided a dichroic element 78 which is interposed between the condensing lens 64 and the dichroic cube 66. The dichroic element 78 has the property that it transmits light with wavelengths under about 700 nanometers and reflects light with wavelengths above about 700 nanometers. There is also provided a dichroic element 79 which reflects light at wavelengths under 900 nanometers and transmits light at wavelengths above 900 nanometers. This is because the longer wavelength light adds heat to the laser without contributing excitation energy, which would increase the cooling requirements. The light reflected from the dichroic element 78, which impinges on the laser 20, thus has wavelengths between 700 and 900 nanometers, which is above the normal visible range. The enclosure of the laser 20 is formed with an elongated opening 80 covered with a transparent material so that the laser rod itself is exposed along its entire length. Since the light from the lamp 62, after it passes through the lens 64, is a collimated beam, an aspheric optical lens 82 is provided to change the collimated light beam to an elliptical shape so as to substantially uniformly illuminate the laser rod.

Accordingly, there has been disclosed an improved arrangement for providing excitation energy to a laser utilized in a combined laser recorder and projection system. It is understood that the above-described embodiment is merely illustrative of the application of the principles of this invention. Numerous other embodiments may be devised by those skilled in the art without departing from the spirit and scope of this invention, as defined by the appended claims.

I claim:

1. In a recording and projection system which includes a laser utilized for recording an image and a source of projection light utilized for projecting the recorded image, the improvement comprising:
   means utilizing said projection light source for providing excitation energy for said laser.

2. The improvement according to claim 1 wherein said excitation energy providing means includes means for directing light having wavelengths above the normal visible range from the projection light source to said laser.

3. The improvement according to claim 2 wherein said directing means includes a dichroic element arranged to pass light from said projection light source which has wavelengths within the normal visible range in a first direction to be utilized for projecting the recorded image and to pass light from said projection light source which has wavelengths above the normal visible range in a second direction to said laser for providing excitation energy therefore.

4. The improvement according to claim 3 wherein said projection light source provides a collimated beam of light and further including an aspheric optical lens interposed between said dichroic element and said laser for substantially uniformly illuminating said laser.

5. The improvement according to claim 2 further including means for only passing light to said laser which is within a limited band of wavelengths above the normal visible range, that band being such that excitation energy is provided to said laser without substantially heating said laser.

6. The improvement according to claim 5 wherein said laser is a YAG laser and said limited band is from about 700 to about 900 nanometers.

* * * * *